(12) United States Patent
Gremillion et al.

(10) Patent No.: US 7,028,603 B1
(45) Date of Patent: Apr. 18, 2006

(54) COMBINATION WATER AND COFFEE DISPENSER

(76) Inventors: Paul J. Gremillion, 210 Elmwood St., Slidell, LA (US) 70460; Gary V. Triola, 71097 Hwy. 41, Pearl River, LA (US) 70452

( * ) Notice: Subject to any disclaimer, the term of this patent is extended or adjusted under 35 U.S.C. 154(b) by 41 days.

(21) Appl. No.: 10/382,546

(22) Filed: Mar. 6, 2003

Related U.S. Application Data

(60) Provisional application No. 60/362,129, filed on Mar. 6, 2002.

(51) Int. Cl.
*A47J 31/00* (2006.01)

(52) U.S. Cl. ............................ 99/290; 99/275; 99/323.3

(58) Field of Classification Search ................ 99/290, 99/275, 279, 323.3; 222/146.1, 146.2, 146.6
See application file for complete search history.

(56) References Cited

U.S. PATENT DOCUMENTS

| | | | | |
|---|---|---|---|---|
| 3,641,918 A | * | 2/1972 | Schellgell et al. ............ 99/279 |
| 4,470,999 A | * | 9/1984 | Carpiac ....................... 426/506 |
| 4,583,449 A | * | 4/1986 | Dangel et al. ................ 99/279 |
| 5,285,718 A | * | 2/1994 | Webster et al. ............... 99/290 |
| 5,836,169 A | * | 11/1998 | Marlette ...................... 62/331 |
| 6,073,539 A | | 6/2000 | Triola et al. |

* cited by examiner

*Primary Examiner*—Reginald L. Alexander
(74) *Attorney, Agent, or Firm*—Kenneth L. Tolar

(57) ABSTRACT

A combination water and coffee dispenser includes a hollow housing having an interior chamber. A water supply line extends from a domestic water source into the interior chamber for supplying fresh water to a cold water storage tank, a hot water storage tank and possibly to a raw water dispensing nozzle on the exterior of the housing. A liquid coffee concentrate storage container is received within the interior chamber and is in liquid communication with a pump. A discharge tube extends from the pump to a mixing chamber. Hot water is routed from the hot water storage tank to the mixing chamber wherein the hot water is mixed with liquid coffee concentrate to produce coffee having a predetermined concentration. The pump speed and thus the concentration of coffee produced in the mixing chamber is controlled by a potentiometer. The device is also equipped with a chilled compartment for storing refrigerated liquid coffee concentrate formulations.

7 Claims, 5 Drawing Sheets

COMBINATION WATER AND COFFEE DISPENSER

BACKGROUND OF THE INVENTION

This application is entitled to the benefit of provisional application No. 60/362,129, filed Mar. 6, 2002, under 35 U.S.C. §119(e). The present invention relates to a combination water and coffee dispenser designed to instantly produce and dispense a desired amount of hot coffee using liquid coffee concentrate.

DESCRIPTION OF THE PRIOR ART

Conventional coffee brewing equipment such as automatic drip coffee makers are burdensome and time consuming to operate. Furthermore, the amount of coffee that can be brewed at any one time is typically limited. The present invention overcomes the disadvantages associated with conventional coffee makers by providing a device that can instantly produce coffee using liquid coffee concentrate.

In addition, certain liquid coffee concentrate formulations are unstable at room temperature and must be constantly chilled or refrigerated to prevent degradation. Accordingly, the present invention is equipped with a chilled compartment for storing containers of refrigerated liquid coffee formulations.

SUMMARY OF THE INVENTION

The present invention relates to a combination water and coffee dispenser specifically designed to instantly produce coffee using liquid coffee concentrate. The device includes a hollow housing having an interior chamber with a liquid coffee concentrate pump, a cold water storage tank and a hot water storage tank received therein. A water supply line coupled with a domestic water source and filter extends into the housing interior chamber for delivering fresh filtered water to the hot water and cold water storage tanks. The pump delivers coffee concentrate from a liquid coffee storage reservoir to a mixing chamber. A button positioned on an outer wall of the housing activates the coffee pump to deliver coffee concentrate to the mixing chamber. A hot water supply line likewise extends from the hot water storage tank to the mixing chamber wherein hot water and liquid coffee concentrate are mixed to produce coffee. A potentiometer adjusts the pump speed to vary the concentration of coffee being produced.

The device described above is designed primarily for use with shelf stable liquid coffee concentrate formulations. However, certain liquid coffee concentrate formulations are unstable at room temperature and, therefore, must be refrigerated or chilled. Accordingly, the above described device could be equipped with a uniquely designed chilled compartment for storing unstable formulations.

It is therefore an object of the present invention to provide a combination water and coffee dispenser that allows a user to instantly produce a desired amount of coffee.

It is another object of the present invention to provide a coffee and water dispenser that can instantly deliver a desired amount of hot coffee without brewing or intermittently reloading a coffee maker.

It is yet another object of the present invention to provide a combination water and coffee dispenser that allows a user to quickly and easily produce a desired amount of coffee.

It is yet another object of the present invention to provide a combination water and coffee dispenser adapted to instantly dispense fresh coffee produced from refrigerated liquid coffee concentrate formulations. Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
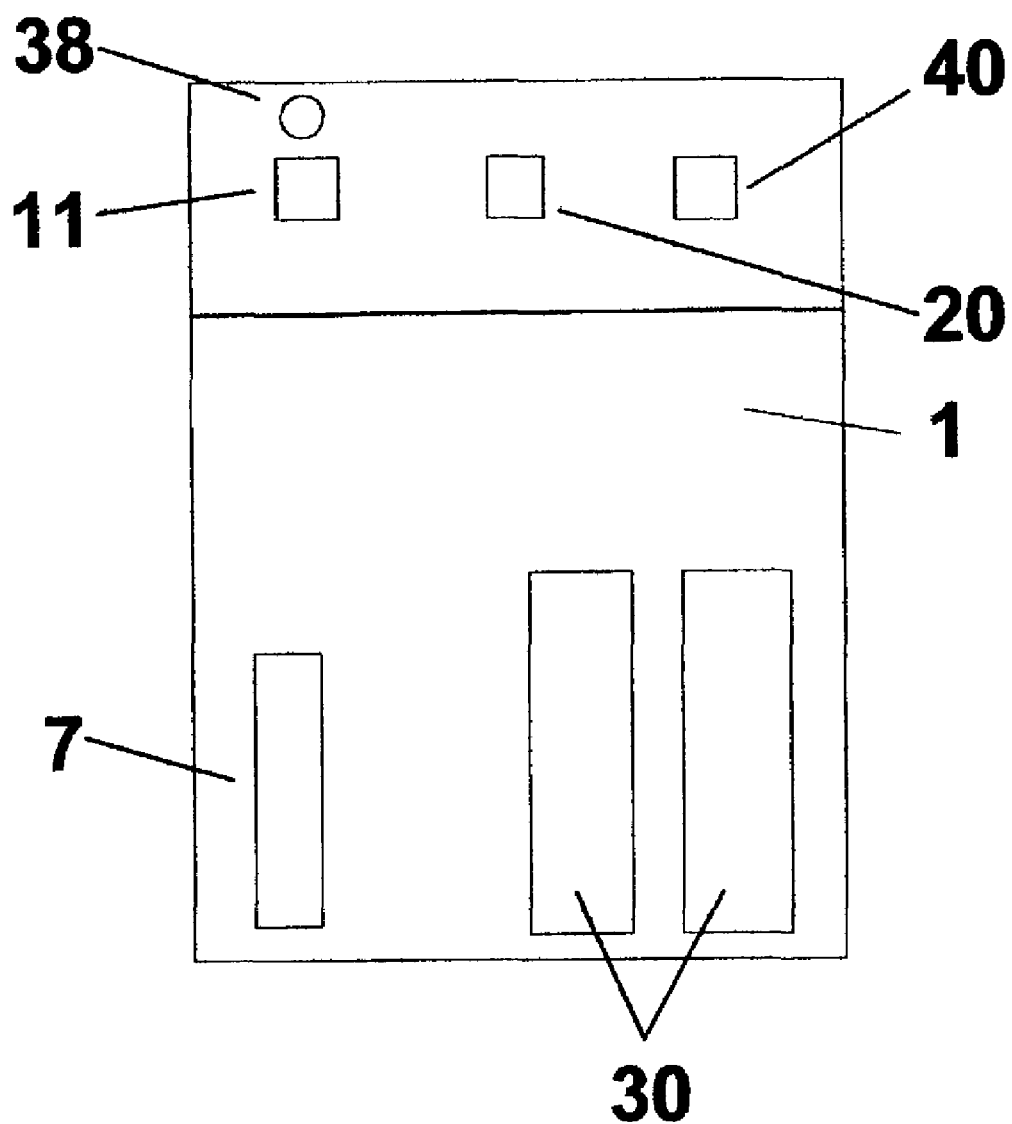
FIG. 1 is a front view of the device.
Figure 2:
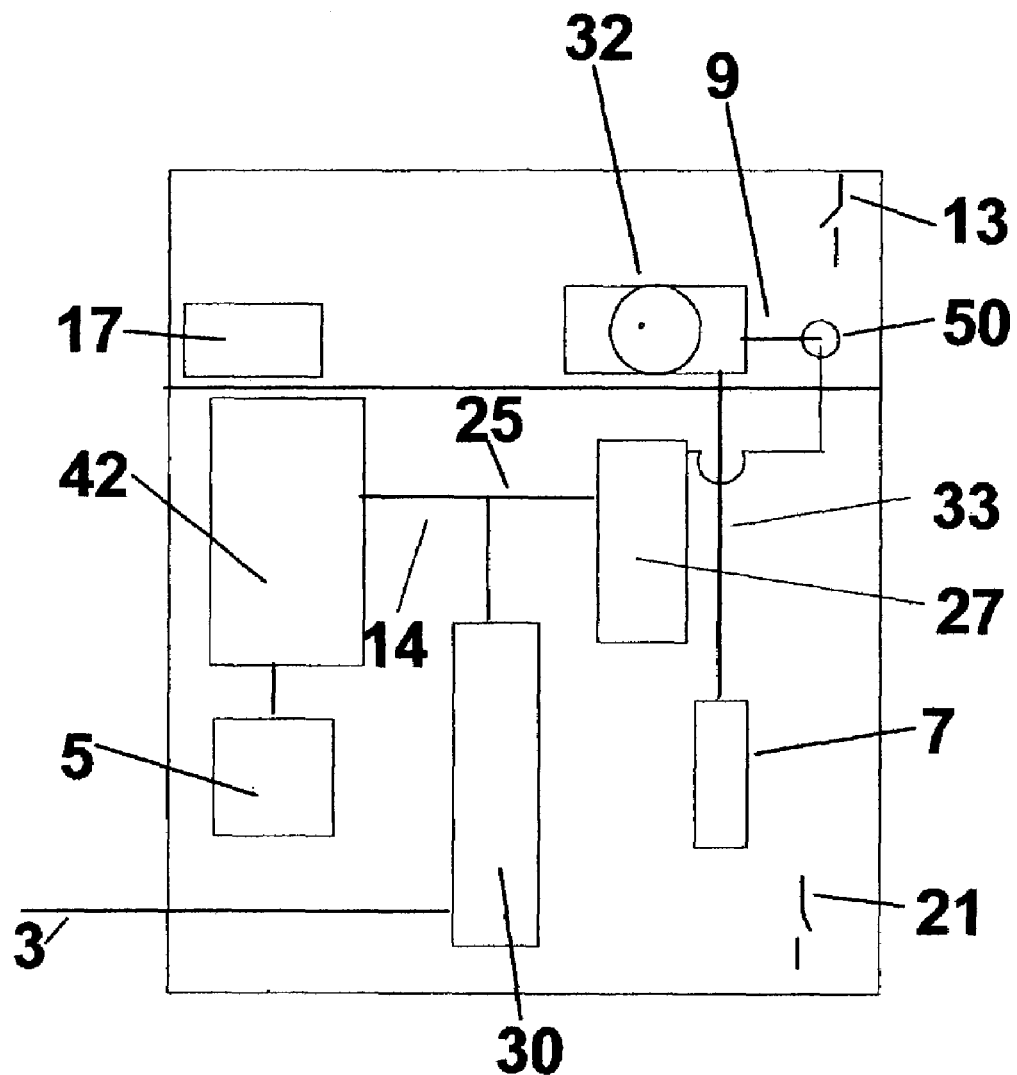
FIG. 2 is a side, partial cutaway view of the device.

Referring now to FIGS. 1 through 5, the present invention relates to a combination water and coffee dispenser. The device includes a hollow housing 1 having a front wall, a rear wall, a pair of side walls and an interior chamber. A water supply line 3 extends from a domestic water source to the interior chamber. Preferably, the water supply line includes a filter 30 for removing organics, metals and similar contaminants. A first filter effluent stream 14 is routed to a cold water storage tank 42 having chiller system 5 that maintains water within the storage tank 42 below a predetermined temperature. A second filter effluent stream 25 is routed to a heated water storage tank 27.

Received within the interior chamber is a liquid coffee concentrate storage container 7. A coffee supply line extends 33 from the container 7 to a pump 32 while a discharge tube 9 extends from the pump outlet to a mixing chamber 50. Effluent from the hot water storage tank is also routed to the mixing chamber 50 wherein hot water and coffee concentrate are mixed to produce coffee having a desired concentration.

Figure 3:
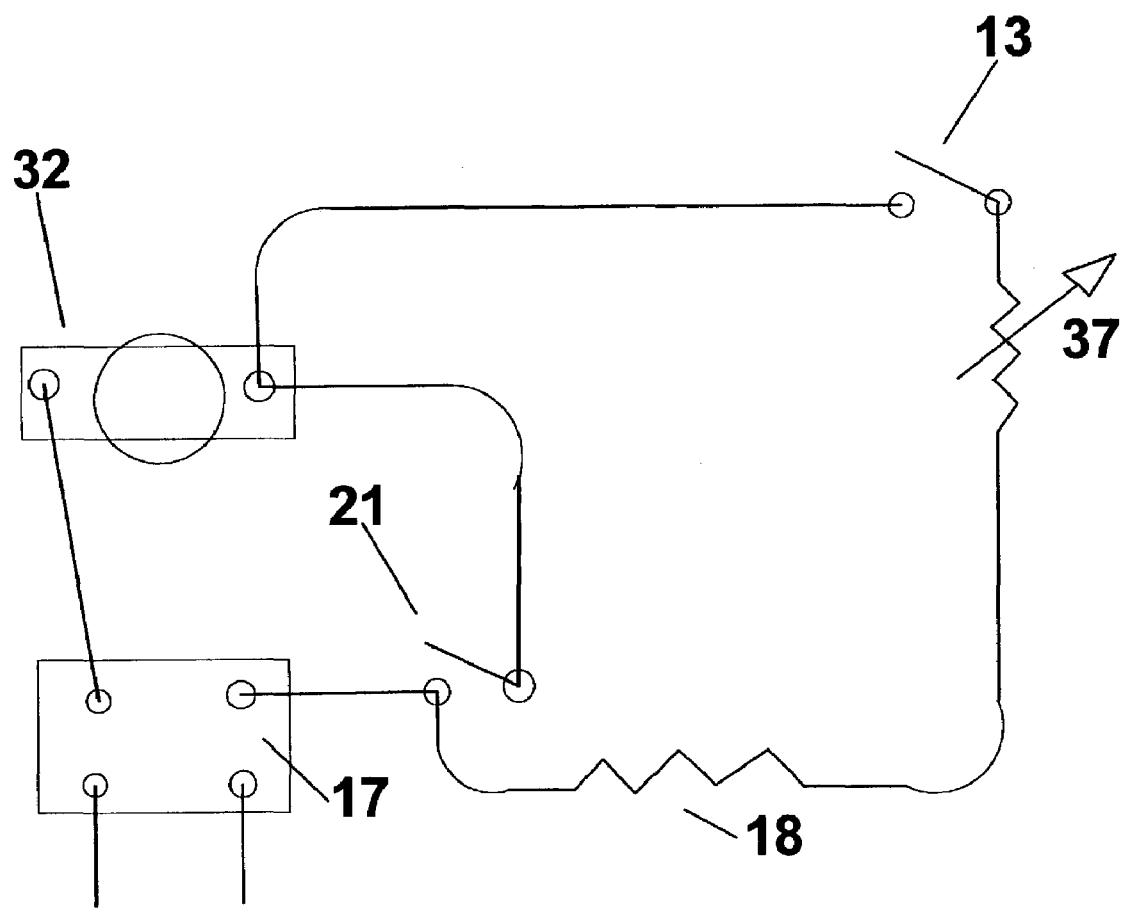
FIG. 3 is a schematic of the electrical components.

A coffee dispensing button 11 is disposed on the housing front wall that, in combination with a micro-switch 13, activates the pump 32. A potentiometer 37, adjustable with a rotatable dial 38 disposed on the front face of the housing, adjusts the speed of the pump to vary the concentration of coffee being produced in the mixing chamber. As depicted in FIG. 3, the potentiometer circuit also includes a fixed resistor 18. Accordingly, by depressing the coffee dispensing button 11, a user can quickly and conveniently dispense a fresh cup of coffee via a dispensing nozzle (not pictured).

Likewise disposed on the front face of the housing is a cold water dispensing button 40 for dispensing water directly from the cold water storage tank and a filtered water dispensing button 20 for dispensing filtered, room temperature water. Alternatively, the housing could include a hot water dispensing button, a cold water dispensing button and a coffee dispensing button, or any combination thereof. Furthermore, a toggle switch 21 is electrically connected to a power source 17 and the pump 32. When the toggle switch 21 is activated, power bypasses the potentiometer whereby the pump operates at maximum speed for priming and flushing the system.

The above described device is primarily designed for liquid coffee concentrate formulations commonly described as "shelf stable." However, certain liquid coffee concentrate formulations are unstable and must be refrigerated in order to prevent degradation. As such, the above described device may be equipped with a chilled coffee storage compartment for storing containers of refrigerated liquid coffee concentrate.

Figure 4:
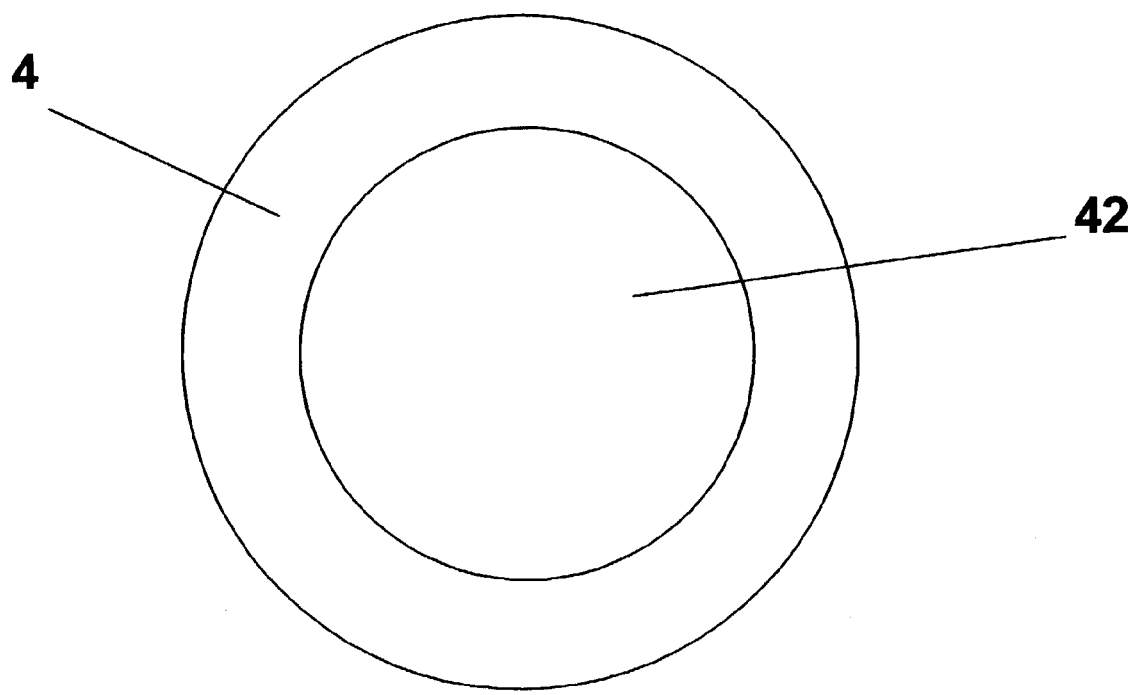
FIG. 4 is a top, cross-sectional view of a conventional cold water storage reservoir.
Figure 5:
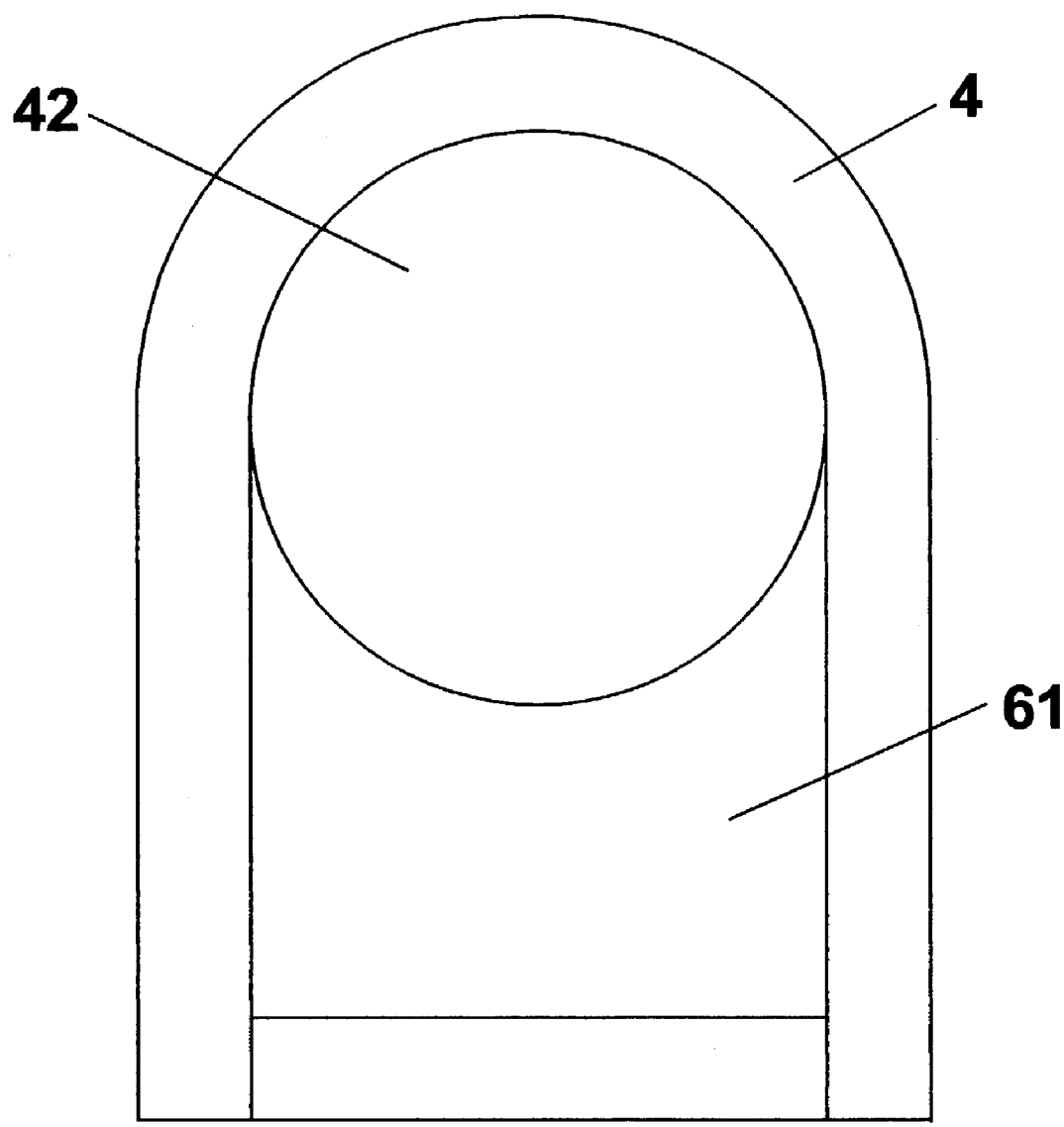
FIG. 5 is a top, cross-sectional view of a cold water storage unit and juxtaposed chilled compartment for storing refrigerated liquid coffee concentrate.

Referring now to FIGS. 4 and 5, conventional beverage dispensing machines as well as the dispenser described above include a cold water storage tank 42 received within the housing. Typically, the storage tank is cylindrical and is encapsulated by a skirt 4 constructed with foam or a similar insulating material. The present invention includes modifying the foam skirt to form a separate, segregated storage compartment 61 for receiving containers of refrigerated liquid coffee concentrate.

Referring now to FIG. 5, the foam encasing the cold water storage tank 42 is extended beyond a portion of the cold water storage tank 42 wall to form a space therebetween. The space between the foam and cold water storage tank forms the coffee storage compartment 61. The insulated enclosure in combination with the chilled water tank will maintain the temperature within the compartment below a predetermined level so as to suitably store and preserve refrigerated liquid coffee concentrate formulations. The combination cold water storage tank and chilled coffee storage compartment can be used with the coffee and water dispenser described above, any conventional coffee or water dispenser, a conventional bottled water dispenser or the combination bottled water and coffee dispenser described in U.S. Pat. No. 6,073,539, the specification of which is incorporated by reference as if copied herein in extenso.

The present invention is not to be limited to the exact details of construction and enumeration of parts described above. Furthermore, the size, shape and materials of construction of the various components can be varied to suit a particular application.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination water and coffee dispenser comprising:
    a hollow housing having at least one exterior wall and an interior chamber;
    a chilled water storage tank received within said interior chamber, said chilled water storage tank in fluid communication with an external water source;
    a heated water storage tank received within the housing interior chamber, said heated water storage tank in fluid communication with an external water source;
    a liquid coffee concentrate storage container received within said housing interior chamber; said container having liquid coffee concentrate stored therein;
    a mixing chamber received within said interior chamber, said mixing chamber in fluid communication with said heated storage tank and said liquid coffee concentrate storage container whereby hot water and liquid coffee concentrate are mixed therein to produce coffee having a desired concentration;
    means for automatically delivering coffee concentrate from said liquid coffee storage container to said mixing chamber;
    means for priming and flushing said means for automatically delivering coffee concentrate from said liquid coffee storage container to said mixing chamber;
    a chilled coffee storage compartment received within the interior chamber of said housing for storing containers of unstable liquid coffee concentrate, said chilled water storage tank includes an outer wall with a substantial portion encapsulated by an insulating skirt with a portion of said skirt extending a predetermined distance beyond the chilled water tank outer wall forming a space therebetween, said space defining said chilled coffee storage compartment.

2. The combination according to claim 1 further comprising a supply line routed from a domestic water source to said heated water storage tank and said chilled water storage tank.

3. The combination according to claim 2 whereby said supply line includes a filter for removing contaminants from said domestic water source.

4. The combination according to claim 1 wherein said means for automatically delivering coffee concentrate from said liquid coffee storage container to said mixing chamber comprises a pump received within said interior chamber, said pump in fluid communication with said liquid coffee concentrate storage container and said mixing chamber for automatically delivering coffee concentrate from said liquid coffee storage container to said mixing chamber.

5. The combination according to claim 4 further comprising a potentiometer electrically connected to said pump for varying the speed of said pump to modify the concentration of coffee produced in said mixing chamber.

6. The combination according to claim 5 further comprising a first switch means for activating said pump.

7. The combination according to claim 6 wherein said means for priming and flushing said means for automatically delivering coffee concentrate from said liquid coffee storage container to said mixing chamber comprises a second switch means for bypassing said potentiometer whereby said pump operates at a maximum operating speed for priming and flushing.

\* \* \* \* \*